July 15, 1969

S. CULTRERA 3,455,056

FISHING FLOATS

Filed July 5, 1968

INVENTOR
SAMUEL CULTRERA
BY
Morse, Altman & Oates
ATTORNEYS

United States Patent Office 3,455,056
Patented July 15, 1969

3,455,056
FISHING FLOATS
Samuel Cultrera, 128 Vinton St., Melrose, Mass. 02176
Continuation-in-part of application Ser. No. 538,264,
Mar. 29, 1966. This application July 5, 1968, Ser.
No. 748,128
Int. Cl. A01k 93/00
U.S. Cl. 43—44.91                                   2 Claims

ABSTRACT OF THE DISCLOSURE

A fishing float has a buoyant body with a vertically slidable core. The core is hollow and has a central tube through which the fishing line is threaded. The core also has a lateral recess wherein some of the fishing line is exposed to engagement by a lock hammer carried by the float body in a recess opposite to the recess in the core. The core holds the lock hammer away from the fishing line until the core admits enough water to cause the core to descend and permit the lock hammer to engage and bind the fishing line in the core recess. The core has adjustable means on its lower portion to vary the rate at which water is admitted, thus controlling the length of the fishing line below the float.

---

This application is a continuation-in-part of my co-pending application Ser. No. 538,264, filed Mar. 29, 1966 and later abandoned. The invention relates to a fishing float which can be cast with a sinker and hook on the fishing line. When the float hits the water, the sinker and hook descend a predetermined distance below the surface of the water whereupon the mechanism in the float grips the fishing line and prevents further descent of the sinker and hook. When the line is reeled in, it passes freely through the float so that the sinker rises into contact with the float and is then reeled in with it. For a more complete understanding of the invention reference may be had to the following description thereof and to the drawing, of which FIGURE 1 is a perspective view of a fishing float embodying the invention;

Figure 1:
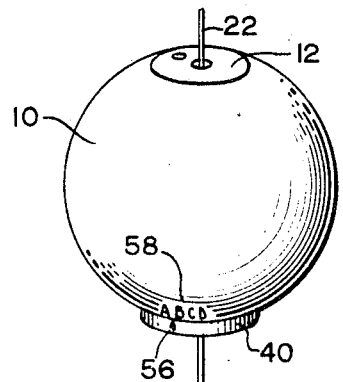
Figure 2:
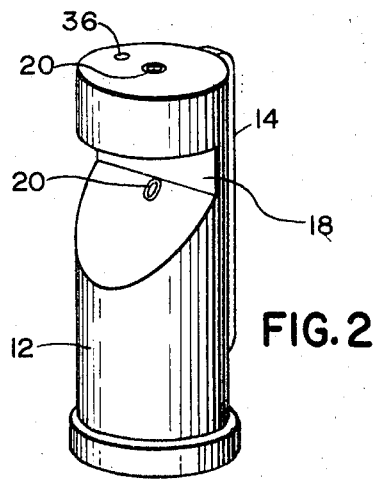
FIGURE 2 is a perspective view, on a larger scale, of a core or plunger which is vertically slidable in the body of the float.
Figure 3:
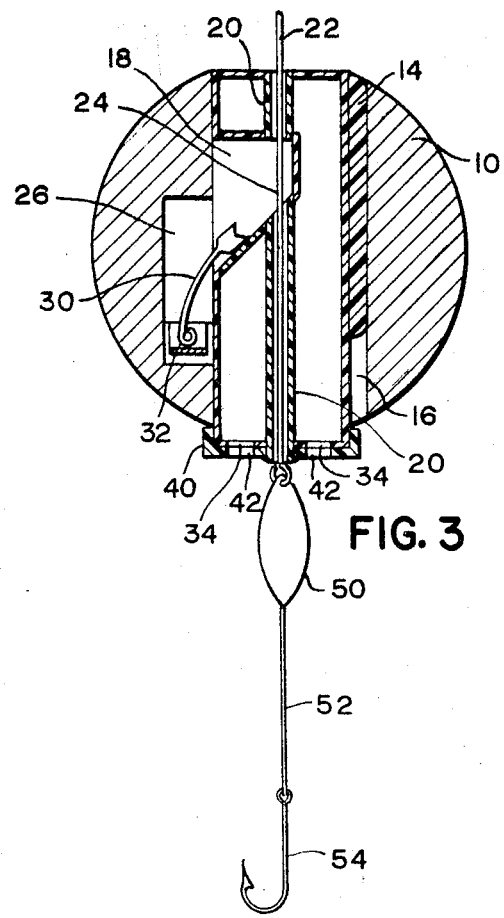
FIGURE 3 is a sectional view of the float, taken on a vertical plane, with the fishing line running free.

The float illustrated on the drawing has a buoyant body 10 which is shown as spherical but can be any desired shape. The body 10 has a vertical bore or passage 11 therethrough in which is slidably fitted a core or plunger 12 which is hollow and preferably made of light-weight material. The hollow plunger 12 has a vertical rib or spline 14 which runs in a groove 16 in the inner wall of the float body. A recess 18 is provided in the side of the plunger 12 opposite the rib 14. A central tube 20 for a fishing line 22 extends from the upper end of the plunger 12 to its lower end except where the tube is interrupted by the recess 18, a portion 24 of the line 22 being exposed in the recess 18. Opposite the recess 18 there is a recess 26 in the float body 10 in which is located a lock hammer 30 which is hinged to a bracket 32 so that it can swing into or out of the recess 18 in the side of the chamber 12. The bracket 32 is secured to the float body.

In the bottom of the plunger 12 are two holes 34 through which water can enter the interior of the plunger from below when the plunger is submerged. A small hole 36 is provided in the top of the plunger for the escape of air when water enters the bottom. To regulate the inflow of water a disk 40 is rotatably mounted against the bottom of the plunger 12. This disk has two holes 42 therethrough adjustable to be registered with the holes 34 or to be somewhat offset therefrom so as to diminish their effective apertures, the size of the apertures determining the rate at which water enters the interior of the plunger.

Figure 4:
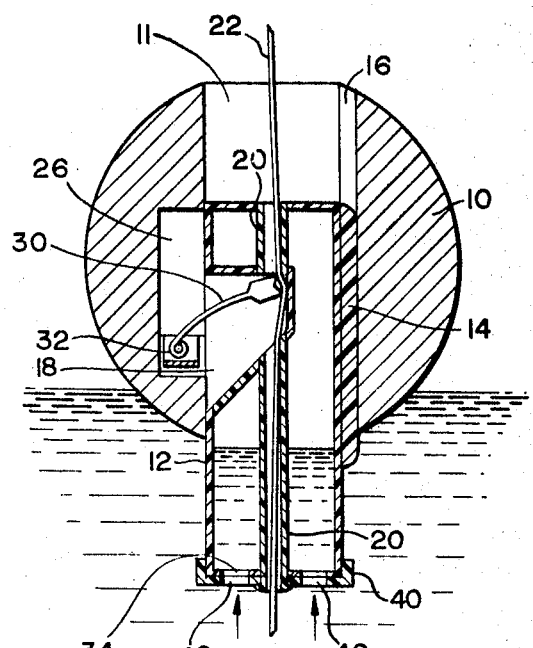
FIGURE 4 is a sectional view of the float with the parts in position to grip the fishing line.
Figure 5:
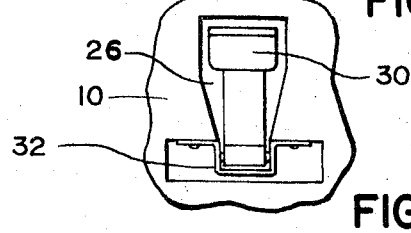
FIGURE 5 is a fragmentary elevational view, on a larger scale, of a recess in the inner wall of the float body and the lock hammer mounted therein.

The operation of the device is as follows. The float, together with a sinker 50, leader 52 and hook 54, can be cast in the usual manner. When it strikes the water it floats on the surface but the sinker and hook at once sink toward the bottom and pull the line 22 through the tube 20. The plunger 12 is buoyant when it hits the water but water at once starts to flow in through the holes 34 until the buoyancy is overcome and the plunger slides down in the bore in the float body. As indicated in FIGURE 4, this permits the lock hammer 30 to rock over against the exposed portion 24 of the line 22, jamming the line against the wall of the plunger 12 and stopping the descent of the sinker and hook. The distance the sinker and hook sink before they are stopped will depend on the size and shape of the sinker and on the rate at which water enters the plunger 12. To facilitate setting the disk 40 to obtain a desired distance of submergence of the hook 54, an index mark 56 may be put on the disk to cooperate with scale marks 58 on an adjacent surface area of the float body. The scale can be calibrated for use with a particular sinker 50.

When the line 22 is reeled in after a cast, it is released by the lock hammer 30 so that it runs freely through the tube 20 until the sinker reaches the bottom of the tube and carries the float with it, the water in the plunger 12 quickly draining therefrom to make the float ready for the next cast.

I claim:
1. A fishing float comprising a buoyant body having a vertical bore therethrough, a hollow plunger slidable in said bore, said plunger having a lateral recess therein, a central vertical tube extending through said plunger and interrupted by said recess whereby a fishing line threaded through said tube has a portion exposed in said recess, said body having therein a recess opposite to but lower than the recess in the plunger when said plunger is in its uppermost position, a lock hammer hinged in the lower portion of said body recess and arranged to swing across the plunger recess to engage the exposed portion of said fishing line when the plunger slides down with respect to the float body, said plunger having means in its bottom to admit water thereinto when submerged whereby to lose its buoyance and slide downward, permitting the lock hammer to swing into contact with the exposed portion of the fishing line.

2. A fishing float as claimed in claim 1, said water admitting means comprising a disk rotatably mounted against the bottom of the plunger and adjustable to regulate the rate of inflow of water into said plunger.

References Cited

UNITED STATES PATENTS

| 992,341 | 5/1911 | Davis | 43—44.88 |
| 2,722,768 | 11/1955 | Fleetwood | 43—44.91 |
| 2,726,476 | 12/1955 | Coughlin | 43—44.92 X |
| 2,825,175 | 3/1958 | Skvier | 43—44.91 |
| 3,381,407 | 5/1968 | McDougall | 43—44.91 |

SAMUEL KOREN, Primary Examiner

J. H. CZERWONKY, Assistant Examiner